United States Patent
Xiong

(10) Patent No.: US 10,057,155 B2
(45) Date of Patent: Aug. 21, 2018

(54) METHOD AND APPARATUS FOR DETERMINING AUTOMATIC SCANNING ACTION

(71) Applicants: NSFOCUS INFORMATION TECHNOLOGY CO., LTD., Haidian District, Beijing (CN); NSFOCUS TECHNOLOGIES, INC., Haidian District, Beijing (CN)

(72) Inventor: Junyong Xiong, Beijing (CN)

(73) Assignees: NSFOCUS INFORMATION TECHNOLOGY CO., LTD., Beijing (CN); NSFOCUS TECHNOLOGIES, INC., Beijing (CN)

( * ) Notice: Subject to any disclaimer, the term of this patent is extended or adjusted under 35 U.S.C. 154(b) by 514 days.

(21) Appl. No.: 14/424,986

(22) PCT Filed: Aug. 29, 2013

(86) PCT No.: PCT/CN2013/082556
§ 371 (c)(1),
(2) Date: Feb. 27, 2015

(87) PCT Pub. No.: WO2014/032600
PCT Pub. Date: Mar. 6, 2014

(65) Prior Publication Data
US 2015/0249589 A1    Sep. 3, 2015

(30) Foreign Application Priority Data

Aug. 29, 2012 (CN) .......................... 2012 1 0313458

(51) Int. Cl.
*H04L 12/26* (2006.01)
*H04L 29/14* (2006.01)
(Continued)

(52) U.S. Cl.
CPC ........ *H04L 43/16* (2013.01); *G06F 17/30864* (2013.01); *H04L 67/10* (2013.01);
(Continued)

(58) Field of Classification Search
CPC ......... H04L 43/16; H04L 67/10; H04L 69/28; H04L 69/40; G06F 17/30864
(Continued)

(56) References Cited

U.S. PATENT DOCUMENTS 7,934,254 B2 * 4/2011 Graham .................. G06F 21/55
709/224
8,250,248 B2 * 8/2012 Rausch .................... G06F 3/061
710/15

(Continued)

FOREIGN PATENT DOCUMENTS

| CN | 101707539 A | 5/2010 |
| CN | 101826996 A | 9/2010 |
| CN | 102868685 A | 1/2013 |

*Primary Examiner* — Hosain Alam
*Assistant Examiner* — Nicholas Allen
(74) *Attorney, Agent, or Firm* — TIPS Group

(57) ABSTRACT

Disclosed are a method and an apparatus for determining an automatic scanning action. The method comprises: in a set period, collecting access request messages sent from a selected send end to a selected network server and access response messages returned from the selected network server to the selected sending end; equally dividing the set period into at least two set sub-periods, successively counting the number of the access request messages in each set sub-periods and determining a request credible value of the selected sending end; counting the number of response success messages and the number of response failure messages in the collected access response messages, and determining a request credible value of the selected sending end; calculating a general accessed value of the selected send end in the set period according to the determined request cred-
(Continued)

ible value, the response credible value, first weight, and second weight; and comparing the general accessed value with a first set threshold, and determining whether is the selected sending end performs automatic scanning This solution is more applicable and more accurate than the prior art.

12 Claims, 3 Drawing Sheets

(51) Int. Cl.
*H04L 29/06* (2006.01)
*G06F 17/30* (2006.01)
*H04L 29/08* (2006.01)
*H04L 12/24* (2006.01)

(52) U.S. Cl.
CPC .............. *H04L 69/28* (2013.01); *H04L 69/40* (2013.01); *H04L 41/06* (2013.01)

(58) Field of Classification Search
USPC ......................................................... 707/748
See application file for complete search history.

(56) References Cited

U.S. PATENT DOCUMENTS

| | | | | | |
|---|---|---|---|---|---|
| 8,254,967 | B1* | 8/2012 | Singh | .................. | H04W 68/005 455/426.1 |
| 9,258,317 | B2* | 2/2016 | Yao | ..................... | H04L 63/1408 |
| 2007/0248058 | A1* | 10/2007 | Fajardo | ................. | H04W 24/00 370/338 |
| 2008/0209517 | A1* | 8/2008 | Nightingale | ........ | H04L 63/1416 726/3 |
| 2008/0225809 | A1* | 9/2008 | Guo | ..................... | H04W 40/246 370/338 |
| 2008/0295175 | A1* | 11/2008 | Ansari | ................. | H04L 63/1416 726/23 |
| 2009/0044276 | A1* | 2/2009 | Abdel-Aziz | .......... | H04L 63/145 726/24 |
| 2009/0171703 | A1* | 7/2009 | Bobak | .................... | G06Q 10/06 705/7.15 |
| 2010/0069035 | A1* | 3/2010 | Johnson | ................... | H04W 4/02 455/404.1 |
| 2010/0131084 | A1* | 5/2010 | Van Camp | ................. | G06F 8/65 700/86 |
| 2010/0188975 | A1* | 7/2010 | Raleigh | ............ | G06Q 10/06375 370/230.1 |
| 2010/0199170 | A1* | 8/2010 | Hoffman | .............. | H04L 63/1416 715/234 |
| 2010/0199348 | A1* | 8/2010 | Sahni | .................. | H04L 63/1416 726/23 |
| 2010/0205297 | A1* | 8/2010 | Sarathy | ............... | H04L 12/2602 709/224 |
| 2010/0238859 | A1* | 9/2010 | Vukovic | ........... | H04W 74/0833 370/328 |
| 2010/0274892 | A1* | 10/2010 | Legrand | .............. | H04L 63/1408 709/224 |
| 2010/0325357 | A1* | 12/2010 | Reddy | ..................... | G06F 21/53 711/118 |
| 2011/0023115 | A1* | 1/2011 | Wright | .................. | G06F 21/552 726/22 |
| 2011/0023118 | A1* | 1/2011 | Wright | ................... | G06F 11/28 726/23 |
| 2011/0030056 | A1* | 2/2011 | Tokunaga | ........... | H04L 63/1458 726/23 |
| 2011/0047620 | A1* | 2/2011 | Mahaffey | .............. | G06F 21/564 726/23 |
| 2011/0055923 | A1* | 3/2011 | Thomas | ................ | G06Q 10/107 726/23 |
| 2011/0093853 | A1* | 4/2011 | Bobak | .................... | G06Q 10/06 718/100 |
| 2011/0107406 | A1* | 5/2011 | Frost | ................... | G06F 9/45558 726/6 |
| 2011/0113491 | A1* | 5/2011 | Altshuler | ............ | H04L 63/1425 726/24 |
| 2011/0167497 | A1* | 7/2011 | Van de Groenendaal | ........... | H04L 41/12 726/24 |
| 2011/0185419 | A1* | 7/2011 | Boteler | ............... | H04L 63/1425 726/22 |
| 2011/0197282 | A1* | 8/2011 | Futamura | ............ | H04L 63/1416 726/24 |
| 2011/0211219 | A1* | 9/2011 | Bradley | ................ | H04W 48/16 358/1.15 |
| 2011/0213869 | A1* | 9/2011 | Korsunsky | .............. | G06F 21/55 709/223 |
| 2011/0239299 | A1* | 9/2011 | Chen | ................... | H04L 63/1408 726/23 |
| 2011/0247074 | A1* | 10/2011 | Manring | ................. | G06F 21/57 726/26 |
| 2011/0283357 | A1* | 11/2011 | Pandrangi | ........... | H04L 63/1416 726/22 |
| 2011/0283358 | A1* | 11/2011 | Cochin | ................. | G06F 21/554 726/23 |
| 2011/0302656 | A1* | 12/2011 | El-Moussa | .......... | H04L 63/1425 726/24 |
| 2012/0022942 | A1* | 1/2012 | Holloway | .......... | G06Q 30/0251 705/14.49 |
| 2012/0023090 | A1* | 1/2012 | Holloway | ........... | H04L 63/0281 707/709 |
| 2012/0047555 | A1* | 2/2012 | Xiao | ...................... | G06F 21/445 726/1 |
| 2012/0058775 | A1* | 3/2012 | Dupray | ................. | G01S 5/0257 455/456.1 |
| 2012/0079592 | A1* | 3/2012 | Pandrangi | ............... | H04L 47/10 726/22 |
| 2012/0093109 | A1* | 4/2012 | Dong | .................. | H04W 74/008 370/329 |
| 2012/0174231 | A1* | 7/2012 | Avritzer | ................. | G06F 11/00 726/25 |
| 2012/0190363 | A1* | 7/2012 | Maeda | .................. | H04W 48/02 455/435.1 |
| 2012/0192276 | A1* | 7/2012 | Andrews | ............... | G06F 21/564 726/24 |
| 2012/0204243 | A1* | 8/2012 | Wynn | ..................... | H04L 63/08 726/5 |
| 2012/0210341 | A1* | 8/2012 | Burke, II | ................ | H04L 63/10 725/23 |
| 2012/0210434 | A1* | 8/2012 | Curtis | .................... | G06F 21/577 726/25 |
| 2012/0216282 | A1* | 8/2012 | Pappu | .................. | H04L 63/1416 726/23 |

\* cited by examiner

METHOD AND APPARATUS FOR DETERMINING AUTOMATIC SCANNING ACTION

This application is a US National Stage of International Application No. PCT/CN2013/082556, filed Aug. 29 2013, designating the United States, and claiming priority to Chinese Application No. 201210313458.3, filed with the State Intellectual Property Office of the People's Republic of China on Aug. 29, 2012 and entitled "Method and apparatus for determining automatic scanning action", which is hereby incorporated by reference in its entirety.

FIELD OF THE INVENTION

The present invention relates to the field of network securities and particularly to a method and a device for determining automatic scanning action.

BACKGROUND OF THE INVENTION

Along with the development of Internet technologies, the amount of information over networks has been trending to explosively grow, and there are also an increasing number of tools generating automatic scanning actions based on the networks, e.g., search engines, downloading tools, scanners, etc., the automatic scanning actions of these tools are not generated by their users but automatically generated by the tools to analyze the information over the networks, and considerable network resources may be occupied by the automatic scanning actions of these tools, thus interfering with normal accesses of the users. It is thus very necessary to determine and block these automatic scanning actions.

There are generally two methods for determining automatic scanning actions: firstly, a library of characteristic information to determine an automatic scanning action is created from characteristic information of tools generating automatic scanning actions, and upon reception of an access request, characteristic information in the access request is matched with the characteristic information in the library of characteristic information to judge whether there is an automatic scanning action, but this method suffers from poor applicability because only an automatic scanning action of an tool with known characteristic information may be determined but unknown characteristic information may not be handled; and secondly, the determination is made according to the frequency of alarms issued by a network security apparatus so that an automatic scanning action is determined when the frequency is higher than some alarm frequency, but this determination method is too simply and suffers from poor accuracy.

In summary, the existing methods for determining an automatic scanning action suffer from poor applicability and accuracy.

SUMMARY OF THE INVENTION

Embodiments of the present invention provide a method and device for determining an automatic scanning action so as to address the problem of poor applicability and accuracy of the existing methods for determining an automatic scanning action.

An embodiment of the present invention provides a method for determining an automatic scanning action, the method including:

collecting access request messages transmitted by a selected transmitter to a selected network server, and access response messages transmitted by the selected network server to the selected transmitter, in a set period;

dividing equally the set period into at least two set sub-periods, counting sequentially numbers of access request messages in the respective set sub-periods and determining a request confidence value of the selected transmitter from the counted numbers of access request messages in the respective set sub-periods;

counting a number of success response messages and a number of failure response messages among the collected access response messages and determining a response confidence value of the selected transmitter from the counted number of success response messages and number of failure response messages;

obtaining a first weight corresponding to the request confidence value and a second weight corresponding to the response confidence value and calculating an overall evaluation value of the selected transmitter in the set period from the determined request confidence value, the determined response confidence value, the first weight and the second weight; and comparing the overall evaluation value with a first set threshold and judging whether there is an automatic scanning action of the selected transmitter.

An embodiment of the present invention provides a device for determining an automatic scanning action, the device including:

a message collecting component configured to collect access request messages transmitted by a selected transmitter to a selected network server, and access response messages transmitted by the selected network server to the selected transmitter, in a set period;

a confidence value determining component configured to divide equally the set period into at least two set sub-periods, to count sequentially numbers of access request messages in the respective set sub-periods and to determine a request confidence value of the selected transmitter from the counted numbers of access request messages in the respective set sub-periods; and to count a number of success response messages and a number of failure response messages among the collected access response messages and to determine a response confidence value of the selected transmitter from the counted number of success response messages and number of failure response messages;

an evaluation value determining component configured to obtain a first weight corresponding to the request confidence value and a second weight corresponding to the response confidence value and to calculate an overall evaluation value of the selected transmitter in the set period from the determined request confidence value, the determined response confidence value, the first weight and the second weight; and a judging component configured to compare the overall evaluation value with a first set threshold and to judge whether there is an automatic scanning action of the selected transmitter.

Advantageous effects of the present invention are as follows:

With the method and device for determining an automatic scanning action according to embodiments of the present invention, access request messages transmitted by a selected transmitter to a selected network server, and access response messages transmitted by the selected network server to the selected transmitter, are collected in a set period; the set period is divided equally into at least two set sub-periods, numbers of access request messages in the respective set sub-periods are counted sequentially, and a request confidence value of the selected transmitter is determined from the counted numbers of access request messages in the respective set sub-periods; a number of success response messages and a number of failure response messages among the collected access response messages are counted, and a response confidence value of the selected transmitter is determined from the counted number of success response messages and number of failure response messages; a first weight corresponding to the request confidence value and a second weight corresponding to the response confidence value are obtained, and an overall evaluation value of the selected transmitter in the set period is calculated from the determined request confidence value and response confidence value, and the first weight and the second weight; and the overall evaluation value is compared with a first set threshold and it is judged whether there is an automatic scanning action of the selected transmitter. With this solution, the overall evaluation value of the selected transmitter is determined according to the collected access request messages transmitted by the selected transmitter and access response messages transmitted by the network server, and then it is judged from a result of comparing the overall evaluation value with the first set threshold whether there is an automatic scanning action of the selected transmitter; with this solution, access request messages and access response messages may be collected for judgment with respect to each selected transmitter, so there will be better applicability than the prior art in which the judgment is made dependent upon a result of matching with known information in the database; and with this solution, the request confidence value of the selected transmitter may be determined from the collected access request messages and the response confidence value of the selected transmitter may be determined from the collected response messages, and then the overall evaluation value of the selected transmitter may be determined from the request confidence value and the response confidence value; and since both the request confidence value and the response confidence value of the selected transmitter are taken into account, there will be higher accuracy than the prior art in which the judgment is made only dependent upon the frequency of alarms issued by a network security apparatus.

DETAILED DESCRIPTION OF THE EMBODIMENTS

Figure 1:
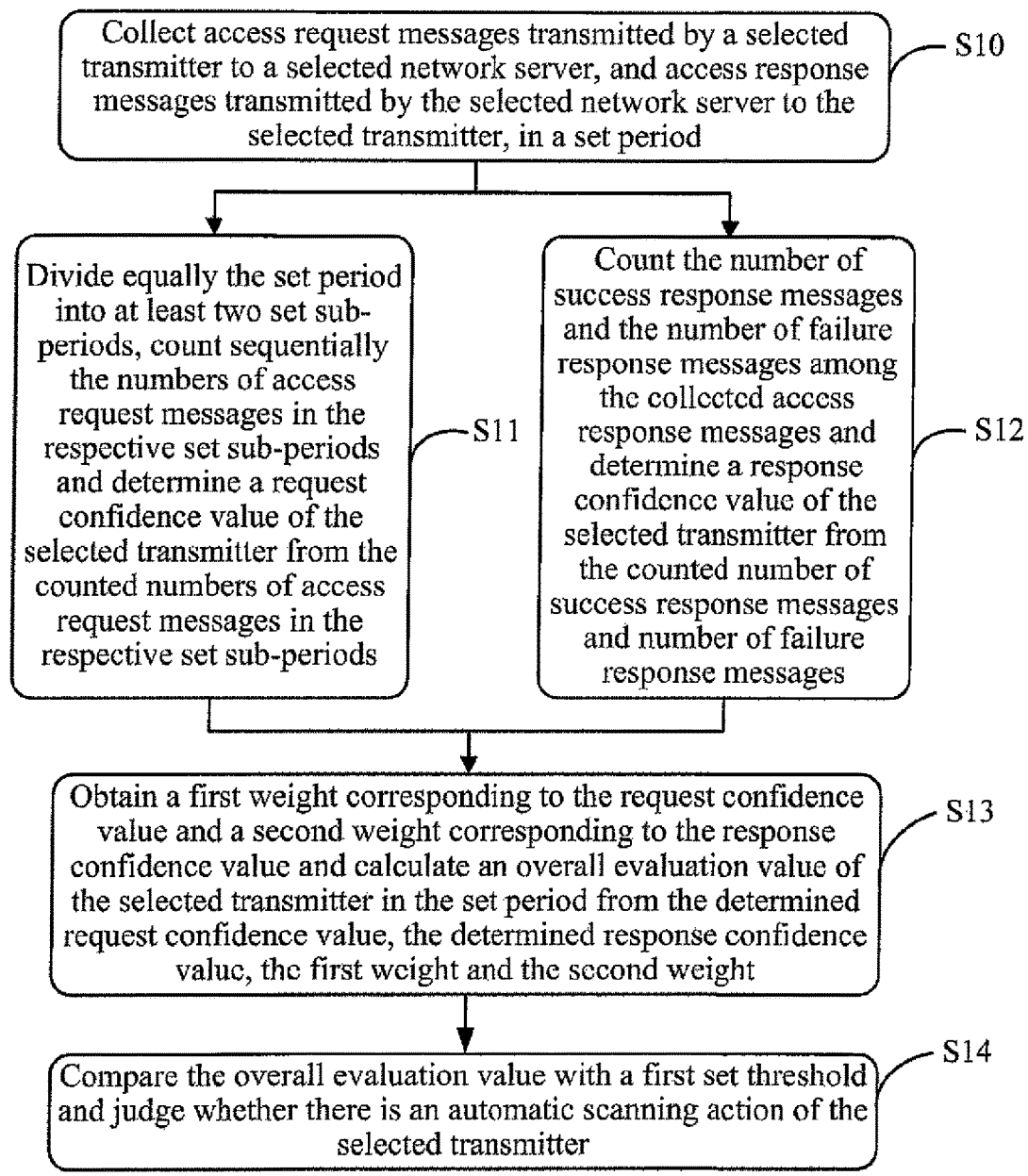
FIG. 1 is a flow chart of a method for determining an automatic scanning action according to an embodiment of the present invention.

In view of the problem of poor applicability and accuracy of the existing methods for determining an automatic scanning action, an embodiment of the present invention provides a method for determining an automatic scanning action, and FIG. 1 illustrates a flow chart of the method including the following operations:

The operation S10 is to collect access request messages transmitted by a selected transmitter to a selected network server, and access response messages transmitted by the selected network server to the selected transmitter, in a set period.

A period of time may be selected as the set period according to the actual requirement, and nowadays there are a number of network servers, one or more of which may be selected as a selected network server or servers, and some selected network server may be accessed by a number of transmitters, all or part of the transmitters may be selected as a selected transmitter or transmitters.

For some selected transmitter, access request messages transmitted therefrom to the selected network server and access response messages transmitted by the selected network thereto may be collected in the set period, that is, access request messages, received by the selected server, carrying the Internet Protocol (IP) address of the selected transmitter as a source IP address, and access response messages, transmitted by the selected server, carrying the IP address of the selected transmitter as a destination IP address, are collected.

The operation S11 is to divide equally the set period into at least two set sub-periods, to count sequentially the numbers of access request messages in the respective set sub-periods and to determine a request confidence value of the selected transmitter from the counted numbers of access request messages in the respective set sub-periods.

The set period is divided equally into at least two set sub-periods, and if the set period is T and a set sub-period is t, then T=nt, where n represents the number of set sub-periods. If the counted number of access request messages collected in the first set sub-period $t_1$ is $y_1$, the counted number of access request messages collected in the second set sub-period $t_2$ is $y_2$, . . . , and the counted number of access request messages collected in the n-th set sub-period $t_n$ is $y_n$, then the request confidence value of the selected transmitter may be determined from $y_1, y_2, \ldots, y_n$.

The operation S12 is to count the number of success response messages and the number of failure response messages among the collected access response messages and to determine a response confidence value of the selected transmitter from the counted number of success response messages and number of failure response messages.

The access response messages of the selected network server to the access request messages of the selected transmitter may be categorized into success response messages and failure response messages, and the response confidence value of the selected transmitter may be determined from the counted number of success response messages and number of failure response messages.

The operations S12 and S11 may not be performed in a particular order so that firstly the operation S11 and then the operation S12 may be performed or firstly the operation S12 and then the operation S11 may be performed, and optionally, the operations S11 and S12 may be performed concurrently.

The operation S13 is to obtain a first weight corresponding to the request confidence value and a second weight corresponding to the response confidence value and calculate an overall evaluation value of the selected transmitter in the set period from the determined request confidence value, the determined response confidence value, the first weight and the second weight.

The first weight and the second weight may be set as required in reality.

The operation S14 is to compare the overall evaluation value with a first set threshold and judge whether there is an automatic scanning action of the selected transmitter.

With this solution, the overall evaluation value of the selected transmitter is determined according to the collected access request messages transmitted by the selected transmitter and access response messages transmitted by the network server, and then it is judged from a result of comparing the overall evaluation value with the first set threshold whether there is an automatic scanning action of the selected transmitter; with this solution, access request messages and access response messages may be collected for judgment with respect to each selected transmitter, so there will be better applicability than the prior art in which the judgment is made dependent upon a result of matching with known information in the database; and with this solution, the request confidence value of the selected transmitter may be determined from the collected access request messages and the response confidence value of the selected transmitter may be determined from the collected response messages, and then the overall evaluation value of the selected transmitter may be determined from the request confidence value and the response confidence value; and since both the request confidence value and the response confidence value of the selected transmitter are taken into account, there will be higher accuracy than the prior art in which the judgment is made only dependent upon the frequency of alarms issued by a network security apparatus.

Figure 2:
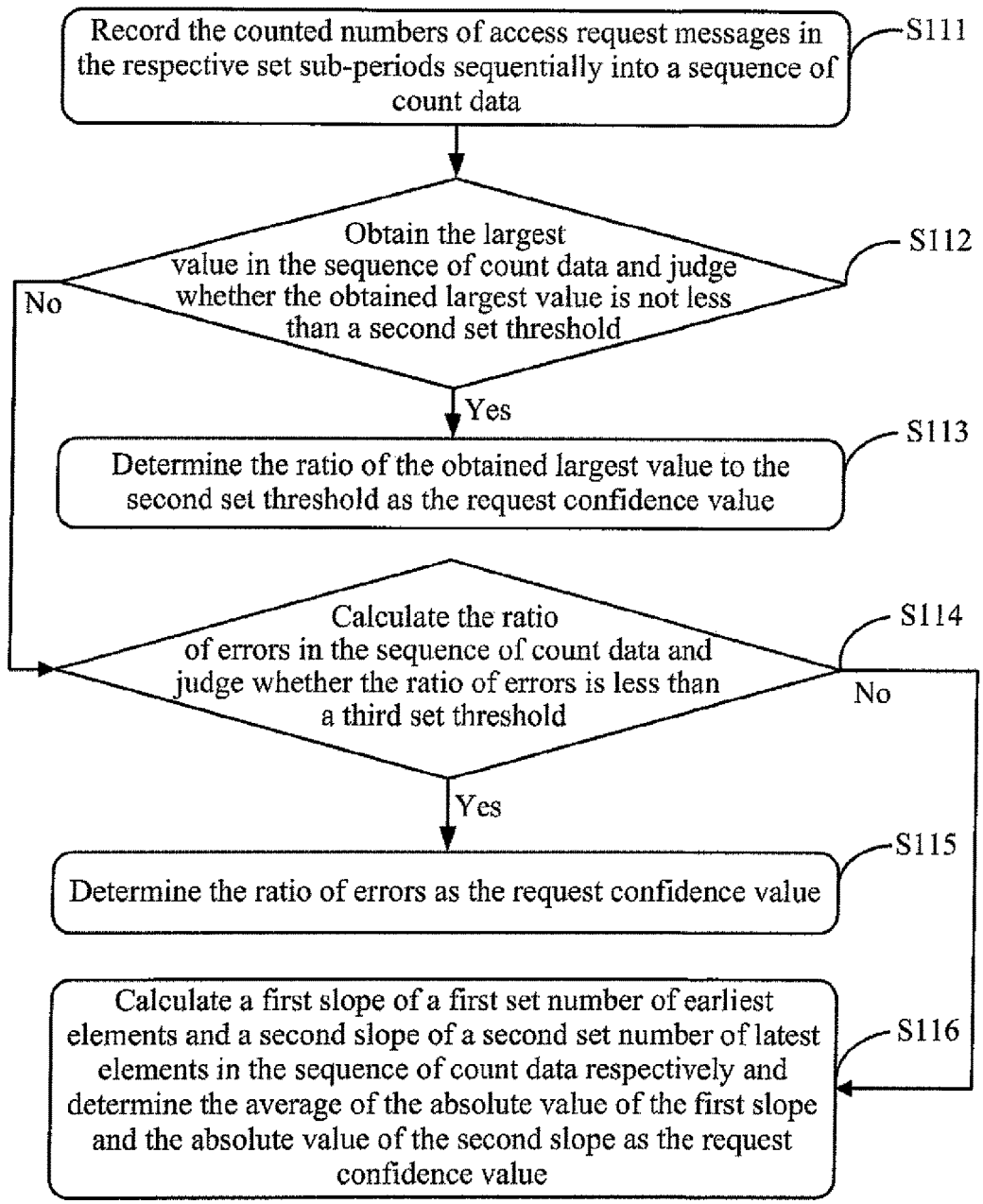
FIG. 2 is a flow chart of a method for determining a request confidence value of a selected transmitter according to an embodiment of the present invention.

The request confidence value of the selected transmitter is determined from the counted numbers of access request messages in the respective set sub-periods in the operation S11 above, particularly as illustrated in FIG. 2 including the following operations:

S111 is to record the counted numbers of access request messages in the respective set sub-periods into a sequence of count data.

The counted numbers of access request messages in the respective set sub-periods are recorded into the sequence of count data $Y_i=(y_1, y_2, \ldots, y_n)$, herein, n represents the number of set sub-periods, i.e., the number of elements in the sequence of count data $Y_i$.

S112 is to obtain the largest value in the sequence of count data, to judge whether the obtained largest value is not less than a second set threshold, and if the obtained largest value is not less than a second set threshold, to proceed to the S113; otherwise, to proceed to the S114.

S113 is to determine the ratio of the obtained largest value to the second set threshold as the request confidence value.

With the second set threshold being $Y_{max}$ and the largest one of $Y_i$ being $y_{max}$, if $y_{max}$ is greater than $Y_{max}$, then the ratio of $y_{max}$ to $Y_{max}$ is determined as the request confidence value Q.

S114 is to calculate the ratio of errors in the sequence of count data, to judge whether the ratio of errors is less than a third set threshold, and if the ratio of errors is less than a third set threshold, to proceed to the S115; otherwise, to proceed to the operation S116.

If $y_{max}$ is not less than $Y_{max}$, then the ratio K of errors in the sequence of count data $Y_i$ needs to be further calculated, Larger K indicates higher dispersion of data in the sequence of count data, which better fits the situation of manually initiating access request messages; and smaller K indicates higher concentration of data in the sequence of count data, which better fits the situation that there is an automatic scanning action for the selected transmitter.

S115 is to determine the ratio of errors as the request confidence value.

If the ratio K of errors is less than the third set threshold, then the ratio K of errors is determined as the request confidence value Q.

S116 is to calculate a first slope of a first set number of earliest elements and a second slope of a second set number of latest elements in the sequence of count data respectively and to determine the average of the absolute value of the first slope and the absolute value of the second slope as the request confidence value.

If the ratio K of errors is not less than the third set threshold, that is, the data in the sequence of count data is so highly dispersed that the request confidence value Q may not be determined, then the first slope of the first set number of earliest elements and the second slope of the second set number of latest elements are selected in the sequence of count data; and suppose that five earliest elements and five latest elements in the sequence of count data $Y_i$ may be selected, then the slope $k_1$ of the five earliest elements and the slope $k_2$ of the five latest elements may be calculated, and the average $$\frac{|k_1| + |k_2|}{2}$$

of the absolute values of $k_1$ and $k_2$ may be determined as the request confidence value Q.

Particularly calculating the ratio of errors in the sequence of count data in the operation S114 above particularly includes: calculating the standard deviation and the average of the sequence of count data; and determining the ratio of the standard deviation to the average of the sequence of count data as the ratio of errors in the sequence of count data.

Particularly calculating the standard deviation and the average of the sequence of count data above particularly includes: calculating the standard deviation $\sigma$ of the sequence of count data $Y_i$ in the equation of $$\sigma = \sqrt{\frac{\sum_{i=0}^{n-1}(y_i - \bar{y})^2}{n-1}};$$

and calculating the average $\bar{y}$ of the sequence of count data $Y_i$ in the equation of $$\bar{y} = \frac{\sum_{i=0}^{n-1} y_i}{n},$$

herein $y_i$ represents the i-th element in the sequence of count data $Y_i$, $i=0, 1, \ldots, n-1$, and n represents the total number of elements in the sequence of count data $Y_i$.

Particularly calculating the first slope of the first set number of earliest elements and the second slope of the second set number of latest elements in the sequence of count data in the operation S116 above particularly includes; calculating the first slope $k_1$ of the first set number of earliest elements in the sequence of count data $Y_i$ in the equation of $$k_1 = \frac{n \sum_{i=0}^{n_1} i \cdot y_i - \sum_{i=0}^{n_1} i \sum_{i=0}^{n_1} y_i}{n \sum_{i=0}^{n_1} i^2 - \left(\sum_{i=0}^{n_1} i\right)^2};$$

and calculating the second slope $k_2$ of the second set number of latest elements in the sequence of count data $Y_i$ in the equation of $$k_2 = \frac{n\sum_{i=n-n_2}^{n} i \cdot y_i - \sum_{i=n-n_2}^{n} i \sum_{i=n-n_2}^{n} y_i}{n\sum_{i=n-n_2}^{n} i^2 - \left(\sum_{i=n-n_2}^{n} i\right)^2},$$

herein $y_i$ represents the i-th element in the sequence of count data $Y_i$, i=0, 1, ..., n-1, $n_1$ represents the first set number, $n_2$ represents the second set number, and n represents the total number of elements in the sequence of count data $Y_i$.

Particularly determining the response confidence value of the selected transmitter from the counted number of the success response messages and number of the failure response messages in the operation s11 above particularly includes: dividing the total number of the collected access response messages by the number of the success response messages to obtain a first ratio and determining the first ratio as the response confidence value; or dividing the total number of the collected access response messages by the number of the failure response messages to obtain a second ratio and determining the difference between 1 and the second ratio as the response confidence value.

If the number of success response messages is counted as $s_1$ and the number of failure response messages in the set period is counted as $s_2$, then $$\frac{s_1}{s_1 + s_2}$$

may be determined as the response confidence value A; or $$1 - \frac{s_2}{s_1 + s_2}$$

may be determined as the response confidence value A.

Particularly the overall evaluation value of the selected transmitter in the set period is calculated from the determined request confidence value and response confidence value, and the first weight and the second weight in the operation S12 above particularly by multiplying the request confidence value by the first weight to obtain a first product, multiplying the response confidence value by the second weight to obtain a second product and determining the sum of the first product and the second product as the overall evaluation value.

The first weight and the second weight may be set as required in reality. If the first weight is set to be $\alpha_1$ and the second weight is set to be $\alpha_2$, then the overall evaluation value is $\alpha_1 Q + \alpha_2 A$.

Particularly the overall evaluation value is compared with the first set threshold and it is judged whether there is an automatic scanning action of the selected transmitter in the operation S13 above particularly by judging that there is an automatic scanning action of the selected transmitter if the overall evaluation value is greater than the first set threshold; and judging that there is no automatic scanning action of the selected transmitter if the overall evaluation value is not greater than the first set threshold.

It may be judged from the comparison of the overall evaluation value $\alpha_1 Q + \alpha_2 A$ and the first set threshold in magnitude, whether there is an automatic scanning action of the selected transmitter.

For the overall evaluation value $\alpha_1 Q + \alpha_2 A$, there are two further special instances: firstly, when the first weight $\alpha_1$ is 0, the response confidence value is the overall evaluation value, that is, it is judged only from the response confidence value whether there is an automatic scanning action of the selected transmitter; and secondly, when the second weight $\alpha_2$ is 0, the request confidence value is the overall evaluation value, that is, it is judged only from the request confidence value whether there is an automatic scanning action of the selected transmitter.

Figure 3:
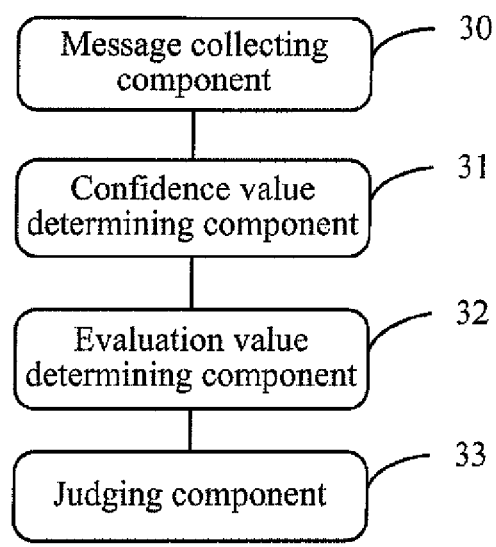
FIG. 3 is a schematic structural diagram of a device for determining an automatic scanning action according to an embodiment of the present invention.

Based upon the same inventive idea, an embodiment of the present invention provides a device for determining an automatic scanning action, and FIG. 3 illustrates a schematic structural diagram of the device including the following components:

A message collecting component 30 is configured to collect access request messages transmitted by a selected transmitter to a selected network server, and access response messages transmitted by the selected network server to the selected transmitter, in a set period.

A confidence value determining component 31 is configured to divide equally the set period into at least two set sub-periods, to count sequentially the numbers of access request messages in the respective set sub-periods and to determine a request confidence value of the selected transmitter from the counted numbers of access request messages in the respective set sub-periods; and to count the number of success response messages and the number of failure response messages among the collected access response messages and to determine a response confidence value of the selected transmitter from the counted number of success response messages and number of failure response messages.

An evaluation value determining component 32 is configured to obtain a first weight corresponding to the request confidence value and a second weight corresponding to the response confidence value and to calculate an overall evaluation value of the selected transmitter in the set period from the determined request confidence value, the determined response confidence value, the first weight and the second weight.

A judging component 33 is configured to compare the overall evaluation value with a first set threshold and to judge whether there is an automatic scanning action of the selected transmitter.

Particularly the confidence value determining component 31 is configured to record the counted numbers of access request messages in the respective set sub-periods in order to obtain a sequence of count data; to obtain the largest value in the sequence of count data and to compare the obtained largest value with a second set threshold; and if the obtained largest value is not less than the second set threshold, to determine the ratio of the obtained largest value to the second set threshold as the request confidence value, and if the obtained largest value is less than the second set threshold, to calculate the ratio of errors in the sequence of count data, and if the ratio of errors is less than a third set threshold, to determine the ratio of errors as the request confidence value.

Particularly the confidence value determining component 31 is configured to calculate the standard deviation and the average of the sequence of count data; and to determine the ratio of the standard deviation to the average of the sequence of count data as the ratio of errors in the sequence of count data.

Particularly the confidence value determining component 31 is configured to calculate the standard deviation σ of the sequence of count data $Y_i$ in the equation of $$\sigma = \sqrt{\frac{\sum_{i=0}^{n-1}(y_i - \overline{y})^2}{n-1}};$$

and to calculate the average $\overline{y}$ of the sequence of count data $Y_i$ in the equation of $$\overline{y} = \frac{\sum_{i=0}^{n-1} y_i}{n},$$

herein $y_i$ represents the i-th element in the sequence of count data $Y_i$, i=0, 1, . . . , n−1, and n represents the total number of elements in the sequence of count data $Y_i$.

Particularly if the ratio of errors is not less than the third set threshold, then the confidence value determining component 31 is further configured to calculate a first slope of a first set number of earliest elements and a second slope of a second set number of latest elements in the sequence of count data respectively and to determine the average of the absolute value of the first slope and the absolute value of the second slope as the request confidence value.

Particularly the confidence value determining component 31 is configured to calculate the first slope $k_1$ of the first set number of earliest elements in the sequence of count data $Y_i$ in the equation of $$k_1 = \frac{n\sum_{i=0}^{n_1} i \Box y_i - \sum_{i=0}^{n_1} i \sum_{i=0}^{n_1} y_i}{n\sum_{i=0}^{n_1} i^2 - \left(\sum_{i=0}^{n_1} i\right)^2};$$

and to calculate the second slope $k_2$ of the second set number of latest elements in the sequence of count data $Y_i$ in the equation of $$k_2 = \frac{n\sum_{i=n-n_2}^{n} i \Box y_i - \sum_{i=n-n_2}^{n} i \sum_{i=n-n_2}^{n} y_i}{n\sum_{i=n-n_2}^{n} i^2 - \left(\sum_{i=n-n_2}^{n} i\right)^2},$$

herein $y_i$ represents the i-th element in the sequence of count data $Y_i$, i=0, 1, . . . , n−1, $n_1$ represents the first set number, $n_2$ represents the second set number, and n represents the total number of elements in the sequence of count data $Y_i$.

Particularly the confidence value determining component 31 is configured to divide the total number of the collected access response messages by the number of the success response messages to obtain a first ratio and to determine the first ratio as the response confidence value; or to divide the total number of the collected access response messages by the number of the failure response messages to obtain a second ratio and to determine the difference between 1 and the second ratio as the response confidence value.

Particularly the evaluation value determining component 32 is configured to multiply the request confidence value by the first weight to obtain a first product, to multiply the response confidence value by the second weight to obtain a second product and to determine the sum of the first product and the second product as the overall evaluation value.

Particularly the judging component 33 is configured to judge that there is an automatic scanning action of the selected transmitter if the overall evaluation value is greater than the first set threshold; and judge that there is no automatic scanning action of the selected transmitter if the overall evaluation value is not greater than the first set threshold.

Evidently those skilled in the art may make various modifications and variations to the present invention without departing from the spirit and scope of the present invention. Thus the present invention is also intended to encompass these modifications and variations thereto so long as the modifications and variations come into the scope of the claims appended to the present invention and their equivalents.

The invention claimed is:

1. A method for determining an automatic scanning action, comprising:
    collecting access request messages transmitted by a selected transmitter to a selected network server, and access response messages transmitted by the selected network server to the selected transmitter, in a set period;
    dividing equally the set period into at least two set sub-periods, counting sequentially numbers of access request messages in the respective set sub-periods and determining a request confidence value of the selected transmitter from the counted numbers of access request messages in the respective set sub-periods;
    counting a number of success response messages and a number of failure response messages among the collected access response messages and determining a response confidence value of the selected transmitter from the counted number of success response messages and number of failure response messages;
    obtaining a first weight corresponding to the request confidence value and a second weight corresponding to the response confidence value and calculating an overall evaluation value of the selected transmitter in the set period from the determined request confidence value, the determined response confidence value, the first weight and the second weight; and
    comparing the overall evaluation value with a first set threshold and judging whether there is an automatic scanning action of the selected transmitter;
    wherein determining the request confidence value of the selected transmitter from the counted numbers of access request messages in the respective set sub-periods comprises:
    recording the counted numbers of access request messages in the respective set sub-periods into a sequence of count data;
    obtaining a largest value in the sequence of count data and comparing the obtained largest value with a second set threshold; and if the obtained largest value is not less than the second set threshold, then determining a ratio of the obtained largest value to the second set threshold as the request confidence value, and if the obtained largest value is less than the second set threshold, then calculate a ratio of errors in the sequence of count data, and if the ratio of errors is less than a third set threshold, then determining the ratio of errors as the request confidence value;

wherein calculating the ratio of errors in the sequence of count data comprises:

calculating a standard deviation and a average of the sequence of count data; and determining a ratio of the standard deviation to the average of the sequence of count data as the ratio of errors in the sequence of count data;

wherein calculating the standard deviation and the average of the sequence of count data comprises:

calculating the standard deviation σ of the sequence of count data $Y_i$ in an equation of:

$$\sigma = \sqrt{\frac{\sum\limits_{i=0}^{n-1}(y_i - \bar{y})^2}{n-1}};$$

and calculating the average $\bar{y}$ of the sequence of count data $Y_i$ in an equation of:

$$\bar{y} = \frac{\sum\limits_{i=0}^{n-1} y_i}{n},$$

wherein $y_i$ represents an i-th element in the sequence of count data $Y_i$, i=0, 1, ..., n−1, and n represents a total number of elements in the sequence of count data $Y_i$.

2. The method according to claim 1, wherein if the ratio of errors is not less than the third set threshold, then the method further comprises:

calculating a first slope of a first set number of earliest elements and a second slope of a second set number of latest elements in the sequence of count data respectively; and determining an average of an absolute value of the first slope and an absolute value of the second slope as the request confidence value.

3. The method according to claim 2, wherein calculating the first slope of the first set number of earliest elements and the second slope of the second set number of latest elements in the sequence of count data comprises:

calculating the first slope $k_1$ of the first set number of earliest elements in the sequence of count data $Y_i$ in an equation of:

$$k_1 = \frac{n\sum\limits_{i=0}^{n_1} i \cdot y_i - \sum\limits_{i=0}^{n_1} i \sum\limits_{i=0}^{n_1} y_i}{n\sum\limits_{i=0}^{n_1} i^2 - \left(\sum\limits_{i=0}^{n_1} i\right)^2};$$

and calculating the second slope $k_2$ of the second set number of latest elements in the sequence of count data $Y_i$ in an equation of:

$$k_2 = \frac{n\sum\limits_{i=n-n_2}^{n} i \cdot y_i - \sum\limits_{i=n-n_2}^{n} i \sum\limits_{i=n-n_2}^{n} y_i}{n\sum\limits_{i=n-n_2}^{n} i^2 - \left(\sum\limits_{i=n-n_2}^{n} i\right)^2},$$

wherein $y_i$ represents an i-th element in the sequence of count data $Y_i$, i=0, 1, ..., n−1, $n_1$ represents the first set number, $n_2$ represents the second set number, and n represents a total number of elements in the sequence of count data $Y_i$.

4. The method according to claim 1, wherein determining the response confidence value of the selected transmitter from the counted number of success response messages and number of failure response messages comprises:

dividing a total number of the collected access response messages by the number of the success response messages to obtain a first ratio and determining the first ratio as the response confidence value; or dividing a total number of the collected access response messages by the number of the failure response messages to obtain a second ratio and determining a difference between 1 and the second ratio as the response confidence value.

5. The method according to claim 1, wherein calculating the overall evaluation value of the selected transmitter in the set period from the determined request confidence value, the determined response confidence value, the first weight and the second weight comprises:

multiplying the request confidence value by the first weight to obtain a first product and multiplying the response confidence value by the second weight to obtain a second product; and determining a sum of the first product and the second product as the overall evaluation value.

6. The method according to claim 1, wherein comparing the overall evaluation value with the first set threshold and judging whether there is an automatic scanning action of the selected transmitter comprises:

judging there is an automatic scanning action of the selected transmitter if the overall evaluation value is greater than the first set threshold; and judging that there is no automatic scanning action of the selected transmitter if the overall evaluation value is not greater than the first set threshold.

7. A device for determining an automatic scanning action, the device comprising a memory, and one or more processors, wherein the memory is configured to store computer readable program codes, and the processor is configured to execute the computer readable program codes to perform:

collecting access request messages transmitted by a selected transmitter to a selected network server, and access response messages transmitted by the selected network server to the selected transmitter, in a set period;

dividing equally the set period into at least two set sub-periods, to count sequentially numbers of access request messages in the respective set sub-periods and to determine a request confidence value of the selected transmitter from the counted numbers of access request messages in the respective set sub-periods; and to count a number of success response messages and a number of failure response messages among the collected access response messages and to determine a response confidence value of the selected transmitter from the counted number of success response messages and number of failure response messages;

obtaining a first weight corresponding to the request confidence value and a second weight corresponding to the response confidence value and to calculate an overall evaluation value of the selected transmitter in the set period from the determined request confidence value, the determined response confidence value, the first weight and the second weight; and comparing the overall evaluation value with a first set threshold and to judge whether there is an automatic scanning action of the selected transmitter;

wherein the processor is further configured to execute the computer readable program codes to perform:

recording the counted numbers of access request messages in the respective set sub-periods into a sequence of count data;

obtaining a largest value in the sequence of count data and to compare the obtained largest value with a second set threshold; and if the obtained largest value is not less than the second set threshold, determining a ratio of the obtained largest value to the second set threshold as the request confidence value, and if the obtained largest value is less than the second set threshold, calculating a ratio of errors in the sequence of count data, and if the ratio of errors is less than a third set threshold, to determine the ratio of errors as the request confidence value;

wherein the processor is further configured to execute the computer readable program codes to perform:

calculating a standard deviation and a average of the sequence of count data; and determining a ratio of the standard deviation to the average of the sequence of count data as the ratio of errors in the sequence of count data;

wherein the processor is further configured to execute the computer readable program codes to perform:

calculating the standard deviation $\sigma$ of the sequence of count data $Y_i$ in an equation of:

$$\sigma = \sqrt{\frac{\sum_{i=0}^{n-1}(y_i - \overline{y})^2}{n-1}};$$

and calculating the average $\overline{y}$ of the sequence of count data $Y_i$ in an equation of:

$$\overline{y} = \frac{\sum_{i=0}^{n-1} y_i}{n},$$

wherein $y_i$ represents an i-th element in the sequence of count data $Y_i$, i=0, 1, ..., n-1, and n represents a total number of elements in the sequence of count data $Y_i$.

8. The device according to claim 7, wherein if the ratio of errors is not less than the third set threshold, then the confidence value determining component is further configured:

calculating a first slope of a first set number of earliest elements and a second slope of a second set number of latest elements in the sequence of count data respectively; and determining an average of an absolute value of the first slope and an absolute value of the second slope as the request confidence value.

9. The device according to claim 8, wherein the processor is further configured to execute the computer readable program codes to perform:

calculating the first slope $k_1$ of the first set number of earliest elements in the sequence of count data $Y_i$ in an equation of:

$$k_1 = \frac{n\sum_{i=0}^{n_1} i \cdot y_i - \sum_{i=0}^{n_1} i \sum_{i=0}^{n_1} y_i}{n\sum_{i=0}^{n_1} i^2 - \left(\sum_{i=0}^{n_1} i\right)^2};$$

and calculating the second slope $k_{11}$ of the second set number of latest elements in the sequence of count data $Y_i$ in an equation of:

$$k_2 = \frac{n\sum_{i=n-n_2}^{n} i \cdot y_i - \sum_{i=n-n_2}^{n} i \sum_{i=n-n_2}^{n} y_i}{n\sum_{i=n-n_2}^{n} i^2 - \left(\sum_{i=n-n_2}^{n} i\right)^2},$$

wherein $y_i$ represents an i-th element in the sequence of count data $Y_1$, i=0, 1, ..., n-1, $n_1$ represents the first set number, $n_{11}$ represents the second set number, and n represents a total number of elements in the sequence of count data $Y_i$.

10. The device according to claim 7, wherein the processor is further configured to execute the computer readable program codes to perform:

dividing a total number of the collected access response messages by the number of the failure response messages to obtain a first ratio and to determine the first ratio as the response confidence value; or dividing a total number of the collected access response messages by the number of the success response messages to obtain a second ratio and to determine a difference between 1 and the second ratio as the response confidence value.

11. The device according to claim 7, wherein the processor is further configured to execute the computer readable program codes to perform:

multiplying the request confidence value by the first weight to obtain a first product and to multiply the response confidence value by the second weight to obtain a second product; and determining a sum of the first product and the second product as the overall evaluation value.

12. The device according to claim 7, wherein the processor is further configured to execute the computer readable program codes to perform:

judging that there is an automatic scanning action of the selected transmitter if the overall evaluation value is greater than the first set threshold; and judging that there is no automatic scanning action of the selected transmitter if the overall evaluation value is no greater than the first set threshold.

* * * * *